(12) United States Patent
Martinez

(10) Patent No.: US 10,046,279 B2
(45) Date of Patent: Aug. 14, 2018

(54) CURABLE COMPOSITIONS AND MEMBRANES

(71) Applicant: Fujifilm Manufacturing Europe B.V., Tilburg (NL)

(72) Inventor: Elisa Huerta Martinez, Tilburg (NL)

(73) Assignee: Fujifilm Manufacturing Europe B.V. (NL)

( * ) Notice: Subject to any disclaimer, the term of this patent is extended or adjusted under 35 U.S.C. 154(b) by 0 days.

(21) Appl. No.: 15/543,631

(22) PCT Filed: Nov. 27, 2015

(86) PCT No.: PCT/GB2015/000310
§ 371 (c)(1),
(2) Date: Jul. 14, 2017

(87) PCT Pub. No.: WO2016/113518
PCT Pub. Date: Jul. 21, 2016

(65) Prior Publication Data
US 2018/0008936 A1    Jan. 11, 2018

(30) Foreign Application Priority Data
Jan. 16, 2015 (GB) .................................. 1500692.7

(51) Int. Cl.
| | | |
|---|---|---|
| *B01J 49/00* | (2017.01) | |
| *C08G 61/04* | (2006.01) | |
| *B01D 67/00* | (2006.01) | |
| *B01D 69/12* | (2006.01) | |
| *B01D 69/10* | (2006.01) | |
| *B01D 71/40* | (2006.01) | |
| *B01D 71/80* | (2006.01) | |
| *C08F 220/58* | (2006.01) | |
| *C08F 2/48* | (2006.01) | |
| *C08F 2/54* | (2006.01) | |
| *C09D 4/00* | (2006.01) | |
| *C08F 2/10* | (2006.01) | |

(52) U.S. Cl.
CPC ......... *B01D 67/0006* (2013.01); *B01D 69/10* (2013.01); *B01D 69/125* (2013.01); *B01D 71/40* (2013.01); *B01D 71/80* (2013.01); *C08F 2/10* (2013.01); *C08F 2/48* (2013.01); *C08F 2/54* (2013.01); *C08F 220/58* (2013.01); *C09D 4/00* (2013.01); *B01D 2323/30* (2013.01); *B01D 2323/345* (2013.01); *B01D 2323/46* (2013.01); *C08F 2220/585* (2013.01)

(58) Field of Classification Search
CPC ............... B01D 67/0006; B01D 71/40; B01D 2323/30; B01D 69/125; B01D 71/80; B01D 69/10; B01D 2323/345; B01D 2323/46; C09D 4/00; C08F 2/54; C08F 2/10; C08F 2220/585; C08F 220/58; C08F 2/48
USPC .......................................... 521/27, 25; 520/1
See application file for complete search history.

(56) References Cited

U.S. PATENT DOCUMENTS

| | | |
|---|---|---|
| 5,310,648 A | 5/1994 | Arnold et al. |
| 5,851,546 A | 12/1998 | Mashelkar et al. |
| 7,279,096 B2 | 10/2007 | Murray |
| 7,955,592 B2 | 6/2011 | Kim et al. |
| 8,591,842 B2 | 11/2013 | Murray et al. |
| 8,877,907 B2 | 11/2014 | Terry et al. |
| 9,441,083 B2 | 9/2016 | Takamoto et al. |
| 9,527,973 B2 | 12/2016 | Hessing et al. |
| 9,556,316 B2 | 1/2017 | Antheunis |
| 2009/0208678 A1* | 8/2009 | van Baak ............... B41M 5/502 428/32.18 |
| 2014/0305863 A1* | 10/2014 | Van Engelen ..... B01D 67/0006 210/500.27 |
| 2015/0068978 A1 | 3/2015 | Lando et al. |
| 2015/0105481 A1* | 4/2015 | Hessing .................. C02F 1/469 521/27 |
| 2015/0259488 A1* | 9/2015 | Takamoto ............... B01D 71/82 521/27 |
| 2016/0077042 A1 | 3/2016 | Warwick et al. |
| 2016/0137797 A1* | 5/2016 | Antheunis .............. B01D 71/40 521/27 |
| 2016/0185629 A1* | 6/2016 | Van Berchum .......... B01J 39/20 429/499 |
| 2017/0007965 A1* | 1/2017 | Van Berchum ............ C08J 5/22 |

FOREIGN PATENT DOCUMENTS

| | | |
|---|---|---|
| WO | 2011073637 A1 | 6/2011 |
| WO | 2011073638 A1 | 6/2011 |
| WO | 2013014420 A1 | 1/2013 |
| WO | 2013-153360 | * 10/2013 |
| WO | 2013153360 A1 | 10/2013 |

(Continued)

OTHER PUBLICATIONS

Post Journal of Membrane Science 330 2009 65-72, Dec. 30, 2008.
Tufa 2014, RSC Adv.,2014,4,42617, Potential of brackish water and brine for energy generation, Aug. 13, 2014.

*Primary Examiner* — Jessica Whiteley
(74) *Attorney, Agent, or Firm* — Banner & Witcoff, Ltd.

(57) ABSTRACT

A curable composition comprising the components (i) 0 to 60 wt % non-ionic crosslinker(s); (ii) 20 to 85 wt % curable ionic compound(s) comprising an anionic group and at least one ethylenically unsaturated group; (iii) 15 to 45 wt % solvent(s); (iv) 0 to 10 wt % of photoinitiator(s); and (v) 2 to 45 wt % of structure modifier(s); wherein the molar ratio of component (v): (ii) is 0.25 to 0.65. The compositions are useful for preparing membranes for (reverse) electrodialysis.

22 Claims, 1 Drawing Sheet

(56) References Cited

FOREIGN PATENT DOCUMENTS

| WO | 2014050993 A1 | 4/2014 |
| WO | 2014188158 A1 | 11/2014 |
| WO | 2014/199125 A1 | 12/2014 |
| WO | 2015/110828 A1 | 7/2015 |

\* cited by examiner

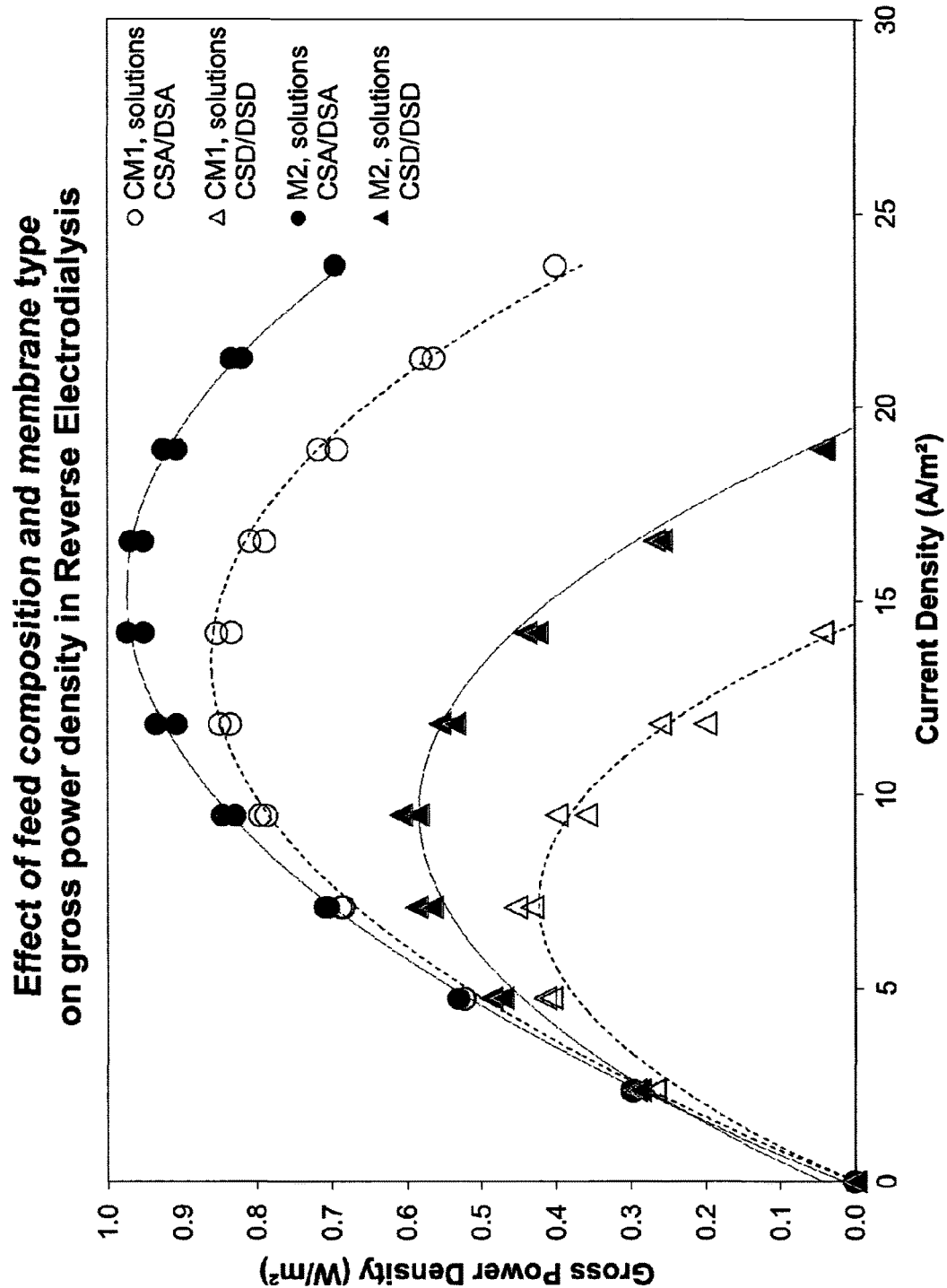

CURABLE COMPOSITIONS AND MEMBRANES

RELATED APPLICATIONS

This application is a National Stage Application under 35 U.S.C. 371 of co-pending PCT application PCT/GB2015/000310 designating the United States and filed Nov. 27, 2015; which claims the benefit of GB application number 1500692.7 and filed Jan. 16, 2015 each of which are hereby incorporated by reference in their entireties.

This invention relates to curable compositions, to their use in the preparation of membranes and to the uses of such membranes.

Reverse electrodialysis ("RED") is a known technique for generating electricity from the mixing of two ionic solutions of different salt concentration. This technique typically uses a reverse electrodialysis unit comprising a membrane stack having alternating cation and anion exchange membranes, electrodes (typically at each end of the stack), a first channel through the reverse electrodialysis unit for a concentrated ionic solution, and a second channel through the reverse electrodialysis unit for a dilute ionic solution. When the concentrated ionic solution is fed through the first channel, and the dilute ionic solution is fed through the second channel, solute from the concentrated solution in the first channel migrates through the membranes to the dilute solution in the second channel, this being accompanied by the generation of an output electricity across the electrodes at the ends of the stack. The voltage generated by the concentration difference across each pair of membranes is low, but this voltage is multiplied by increasing the number of alternating cation and anion exchange membranes separating the two solutions in the membrane stack. RED is of interest for the production of electricity in an environmentally-friendly way. The ionic solutions exiting RED units are usually sent to waste, e.g. by releasing them into rivers or the sea. In an age where gas and electricity prices are high, there is a desire to maximise the efficiency of electricity generation.

One of the problems encountered with membranes currently used for RED is their very high electrical resistance for multivalent ions, especially magnesium ions. Also the permselectivity of ion exchange membranes is negatively influenced by the presence of multivalent ions. The presence of magnesium ions in salts streams can significantly reduce the power output of RED units (as explained by Tufa et al., RSC Adv., 2014, 4, 42617 and by Post et al, J. Membrane Sc. 330, 2009, 65-72).

The present invention addresses the problems created by multivalent ions in ionic solutions by providing membranes having a low electrical resistance to multivalent ions, especially to magnesium ions. By using the curable compositions and membranes of the present invention one may increase the power output of RED devices.

WO 2013/136336 describes a method for the temporary modification of filtration membranes comprising post-treatment of the already formed membrane with certain polyvalent metals.

According to a first aspect of the present invention there is provided a curable composition comprising the components:

(i) 0 to 60 wt % non-ionic crosslinker(s);
(ii) 20 to 85 wt % curable ionic compound(s) comprising an anionic group and at least one ethylenically unsaturated group;
(iii) 15 to 45 wt % solvent(s);
(iv) 0 to 10 wt % of photoinitiator(s); and
(v) 2 to 45 wt % of structure modifier(s);
wherein the molar ratio of component (v):(ii) is 0.25 to 0.65.

Generally speaking, the molar ratio of component (v):(ii) is preferably 0.25 to 0.50 and especially 0.25 to 0.499.

The molar ratio of component (v):(ii) is preferably such that the number of moles of component (v) is 50% to 100% (preferably 60% to 99%, especially 80% to 99%) of the number of moles of ionic groups present in the composition from component (ii). Thus when component (v) is divalent the molar ratio of component (v):(ii) is preferably 0.25 to 0.5, more preferably 0.3 to 0.499, especially 0.4 to 0.499. When component (v) is trivalent the molar ratio of component (v):(ii) is preferably 0.167 to 0.333, more preferably 0.20 to 0.333, especially 0.267 to 0.333.

Preferably the curable composition has a pH below 6, more preferably below 5, in order to reduce the likelihood of gelification of compounds in the composition. The curable composition preferably has a pH above 0.1.

The preferred pH of the composition depends to some extent on whether the curable ionic compound is in the free-acid or salt form. When the curable ionic compound is in the free-acid form the composition preferably has a pH of 0.1 to 5, more preferably 0.4 to 2.5 and especially about 0.8. When the curable ionic compound is at least 95% in the salt form the composition preferably has a pH of 0.5 to 6, more preferably 0.5 to 5 and especially 1 to 4.

The non-ionic crosslinker may be any crosslinker which is free from anionic groups, e.g. free from ionised carboxy, sulpho and phosphato groups.

The primary function of the non-ionic crosslinker is to crosslink component (ii) of the composition. Thus one will generally choose a non-ionic crosslinker which is capable of forming covalent bonds with component (ii) of the composition, e.g. a non-ionic crosslinker comprising at least two ethylenically unsaturated groups.

When the curable composition comprises 0 wt % of component (i) it is preferred that component (ii) comprises one or more curable ionic compound(s) comprising an anionic group and at least two ethylenically unsaturated groups. In this case, component (ii) then provides crosslinking. Optionally the amount of component (i) is not 0 wt % and component (ii) comprises one or more curable ionic compound(s) comprising an anionic group and at least two ethylenically unsaturated groups, in which case the curable composition comprises at least two crosslinkers (i.e. from component (i) and component (ii)).

Component (i) is preferably present in the composition in an amount of at least 2 wt %, more preferably at least 4 wt %, especially at least 8 wt %.

A relatively high crosslinker content generally results in a high permselectivity with a high electrical resistance while for a relatively low crosslinker content the formed membrane structure is more open resulting in a somewhat lower permselectivity. A relatively low crosslinker content allows for a higher content of curable ionic compounds and a higher degree of swelling, both of which can be useful for obtaining a membrane having low electrical resistance.

When a membrane having low electrical resistance is desired, the amount of component (ii) present in the composition is preferably high, while the amount of component (i) will be reduced in order to accommodate the higher amount of component (ii). Thus to prepare membranes having low electrical resistance the preferred content of component (i) is 1 to 20 wt % (e.g. 4 to 20 wt %), more preferably 2 to 15 wt % (e.g. 6 to 15 wt % or 6 to 12 wt %), especially about 4 to about 10 wt %. With this amount of component (i), one can still obtain a reasonably strong membrane with good permselectivity and without excessive swelling.

When a membrane having high permselectivity is desired, the total amount of compounds capable of crosslinking (e.g. the amount of component (ii) comprising an anionic group and two or more ethylenically unsaturated groups plus the amount of component (i)) will generally be chosen higher, preferably in an amount of 10 to 48 wt % (e.g. 14 to 48 wt %, 22 to 43 wt % or 28 to 38 wt %), more preferably from 12 to 35 wt %, especially 14 to 30 wt %.

In a first embodiment the wt % referred to in this specification are calculated relative to the total weight of components (i) to (v). In a second embodiment the wt % referred to in this specification are calculated relative to the total weight of the curable composition.

The non-ionic crosslinker preferably has two or three ethylenically unsaturated groups, more preferably two ethylenically unsaturated groups.

Preferred ethylenically unsaturated groups are methacrylic groups and especially acrylic groups. Preferred acrylic groups are of the formula $H_2C=CH-C(=O)-$. Particularly preferred acrylic groups are acrylate ($H_2C=CH-C(=O)-O-$) and acrylamide ($H_2C=CH-C(=O)-N<$) groups.

Examples of suitable non-ionic crosslinkers comprising two ethylenically unsaturated groups which may be used as component (i) include poly(ethylene glycol) diacrylate, bisphenol-A epoxy acrylate, bisphenol A ethoxylate diacrylate, tricyclodecane dimethanol diacrylate, neopentyl glycol ethoxylate diacrylate, propanediol ethoxylate diacrylate, butanediol ethoxylate diacrylate, hexanediol diacrylate, hexanediol ethoxylate diacrylate, poly(ethylene glycol-co-propylene glycol) diacrylate, poly(ethylene glycol)-block-poly(propylene glycol)-block-poly(ethylene glycol) diacrylate, a diacrylate of a copolymer of polyethylene glycol and other building blocks e.g. polyamide, polycarbonate, polyester, polyimide, polysulfone, and combinations comprising two or more thereof. Other suitable crosslinking agents comprising two acrylic groups are isophorone diacrylamide, N,N'-(1,2-dihydroxyethylene) bis-acrylamide, N,N-methylene-bis-acrylamide, N,N'-ethylenebis(acrylamide), bis(aminopropyl)methylamine diacrylamide. Particularly preferred crosslinking agents are tricyclodecane dimethanol diacrylate, 1,4-diacryoyl piperazine and 1,4-bis(acryloyl) homopiperazine.

Examples of suitable non-ionic crosslinkers comprising more than two ethylenically unsaturated groups which may be used as component (i) include glycerol ethoxylate triacrylate, trimethylolpropane ethoxylate triacrylate, trimethylolpropane ethoxylate triacrylate, pentaerythrytol ethoxylate tetraacrylate, ditrimethylolpropane ethoxylate tetraacrylate, dipentaerythrytol ethoxylate hexaacrylate, 1,3,5-triacryloylhexahydro-1,3,5-triazine, 2,4,6-triallyloxy-1,3,5-triazine, and combinations comprising two or more thereof.

Preferably the total amount of crosslinkers present in the composition (e.g. from components (i) and (ii)) is from 5 to 70 wt %, more preferably from 8 to 60 wt %, especially from 10 to 50 wt %.

The ratio of component (i):(ii) is selected depending on the desired properties for the resultant membrane and depends also on whether component (ii) comprises any curable ionic compounds comprising an ionic group and two or more ethylenically unsaturated groups.

Component (i) optionally comprises one or more than one non-ionic crosslinker. The non-ionic crosslinker optionally comprises a mixture comprising compounds having two ethylenically unsaturated groups and compounds having more than two (e.g. three) ethylenically unsaturated groups.

Component (ii) is preferably present in the composition in an amount of at least 25 wt %, more preferably at least 35 wt %. In general, if one wishes to maximise the electrical charge density in the membrane one will choose an amount of component (ii) which is at or towards the higher end of the aforementioned ranges.

Preferably the molar ratio of component (i) to (ii) is 0 to 1.0, more preferably 0.1 to 0.7.

Preferred curable ionic compounds which may be used as component (ii) comprise an acidic group as anionic group (for example a sulpho, carboxy and/or phosphato group) and at least one ethylenically unsaturated group (e.g. as described above in relation to component (i)). The ethylenically unsaturated groups which may be present in component (i) may be the same as or different to some or all of the ethylenically unsaturated groups which are present in component (ii). Acidic groups may be partially or wholly in salt form. The preferred salts are lithium, ammonium, sodium and potassium salts and mixtures comprising two or more thereof.

Examples of curable ionic compounds comprising an anionic group and one ethylenically unsaturated group which may be used as component (ii) include acrylic acid, beta carboxy ethyl acrylate, maleic acid, maleic acid anhydride, vinyl sulphonic acid, phosphonomethylated acrylamide, (2-carboxyethyl)acrylamide and 2-(meth)acrylamido-2-methylpropanesulfonic acid.

Examples of curable ionic compounds comprising an anionic group and at least two ethylenically unsaturated groups which may be used as component (ii) include the following compounds and salts thereof:

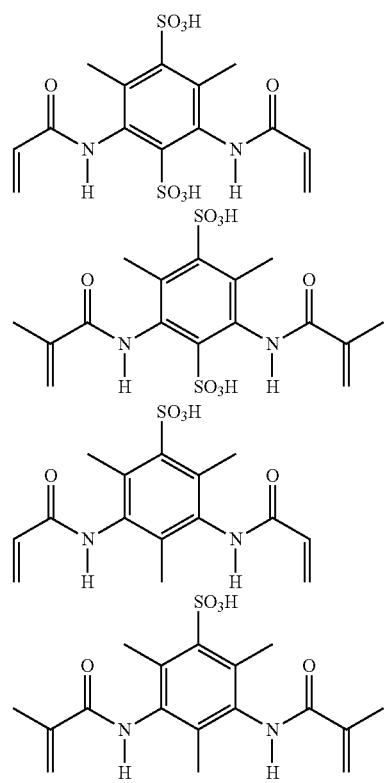

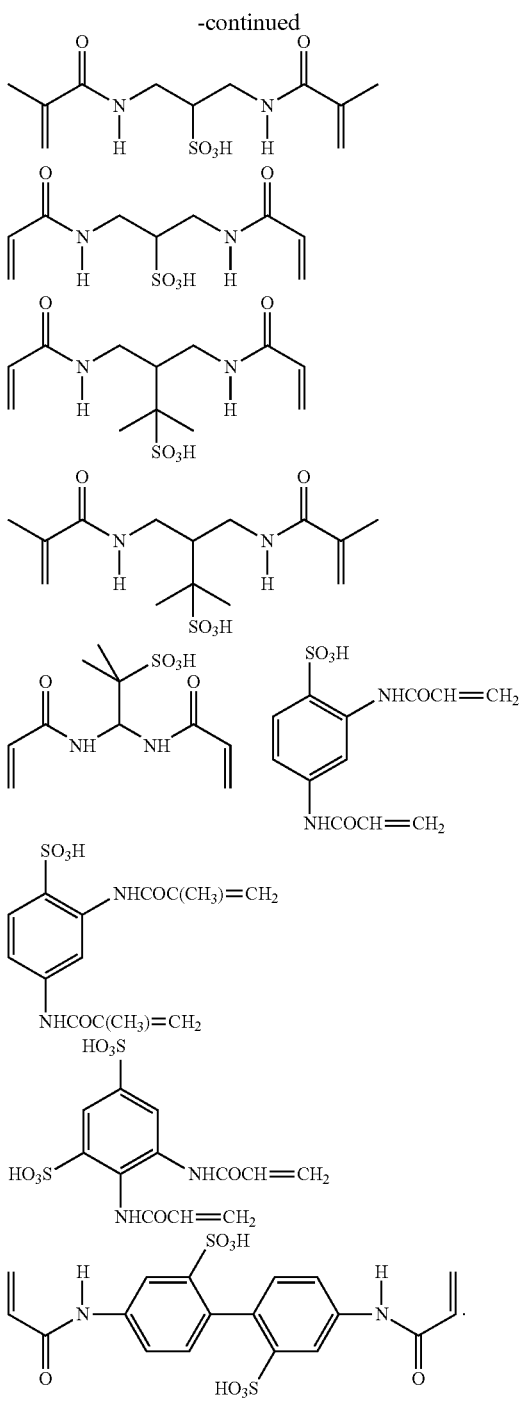

When the curable ionic compounds are in salt form they are preferably in the form of a sodium, potassium, ammonium or lithium salt or a mixture comprising two or more thereof.

The combined, total wt % of component (i) and (ii) is preferably 30 to 90 wt %, more preferably 30 to 85 wt %, especially 40 to 80 wt %. The curable composition may comprise one or more than one non-ionic crosslinker as component (i).

In a particularly preferred embodiment component (i) consist of non-ionic crosslinker(s) having two acrylamide groups and component (ii) consists of curable ionic compound(s) having one or two ethylenically unsaturated groups and one or more anionic group(s).

Preferably the ethylenically unsaturated group in component (ii) is a (meth)acrylamide group because this can result in membranes having particularly good resistance to hydrolysis.

Generally component (i) provides strength to the membrane, while potentially reducing flexibility.

When component (ii) has only one ethylenically unsaturated group it is unable to act as a crosslinker. However it is able to react with component (i). Component (ii) having only one ethylenically unsaturated group can provide the resultant membrane with a desirable degree of flexibility, which is particularly useful in applications requiring tightly wound membranes. Component (ii) also assists the membrane in distinguishing between ions of different charges by the presence of anionic groups.

In one embodiment the composition comprises less than 10 wt %, more preferably less than 5 wt %, of ethylenically unsaturated compounds other than components (i) and (ii). In a preferred embodiment the composition is free from ethylenically unsaturated compounds other than components (i) and (ii).

Component (ii) optionally comprises one or more than one curable ionic compound comprising an anionic group and at least one ethylenically unsaturated group. The ethylenically unsaturated groups present in the or each component (ii) may be the same or different.

The amount of component (iii) present in the composition is preferably the minimum, or less than 5% more than the minimum, necessary to ensure that the composition is in the form of a homogeneous solution, while at the same time being in the range 15 to 45 wt %. The purpose of the solvent is to help dissolve the other components of the composition and it is not copolymerisable with component (i) or (ii), e.g. the solvent is free from ethylenically unsaturated groups. Polar solvents, especially aqueous solvents, are preferred because these are particularly good at dissolving component (ii).

Preferably at least 40 wt % of component (iii) (relative to the total amount of component (iii)) is water, more preferably at least 60 wt % is water. Preferably the amount of component (iii) present in the composition is at least 16 wt %, especially at least 20 wt % and preferably less than 40 wt %, more preferably less than 35 wt %.

The solvent is preferably water or a mixture comprising water and a water-miscible organic solvent. Due to the presence of a water-miscible organic solvent, water-immiscible solvents may also be tolerated in small amounts such that the composition forms a homogenous solution.

When the solvent comprises water and an organic solvent the weight ratio of water:organic solvent is preferably higher than 2:3, more preferably between 10:1 and 1:1, more preferably between 10:1 and 1:2, especially between 4:1 and 1:1, and more especially between 3:1 and 2:1.

Preferred organic solvents include $C_{1-4}$-alcohols (e.g. methanol, ethanol and propan-2-ol), diols (e.g. ethylene glycol and propylene glycol), triols (e.g. glycerol), carbonates (e.g. ethylene carbonate, propylene carbonate, dimethyl carbonate, diethyl carbonate, di-t-butyl dicarbonate and glycerin carbonate), dimethyl formamide, acetone, N-methyl-2-pyrrolidinone and mixtures comprising two or more thereof. Particularly preferred organic solvents are propan-2-ol, methanol and mixtures thereof.

The organic solvent can be useful for providing a homogenous solution of all the components of the composition. The inclusion of an organic solvent may also have advantages in the process for preparing the membrane because many organic solvents will usefully reduce the viscosity and/or surface tension of the composition, making the manufacturing process easier in some respects.

In one embodiment component (iii) has a low boiling point, e.g. a boiling point below 100° C. Solvents having a low boiling point can be easily removed by evaporation, avoiding the need for a washing step for removal of the solvent.

The optimum amount of component (iii) for the curable composition depends to some extent on the interaction between the solvent(s), the curable ionic compound(s) and the non-ionic crosslinker(s), and can be determined for each combination by simple experimentation.

Component (iii) optionally comprises one or more than solvent.

Preferably the composition comprises component (iv) in an amount of 0.01 to 10 wt %, more preferably 0.05 to 5 wt %, especially 0.1 to 2 wt %. The curable composition may comprise one or more than one photoinitiator as component (iv).

For acrylamides, diacrylamides, and higher-acrylamides, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

When a photoinitiator is present in the composition, preferably a polymerization inhibitor is also included (e.g. in an amount of below 2 wt %). The polymerization inhibitor is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 515, 516, 518, 520, 522 and 526 from IGM Resins, Genorad™ 16, 18, 20, 21 and 22 polymerisation inhibitors from Rahn, and mixtures comprising two or more of the foregoing.

The structure modifier (v) is preferably capable of forming ionic bonds with anionic group(s) present in component (ii). In this way, the structure modifier can 'lock' adjacent molecules of component (ii) a specific distance apart and thereby influence the structure of a membrane obtained by curing the composition. One may choose a structure modifier having a particular ionic radius, or having a particular distance between cationic/amine groups, to provide a desired pore size and therefore to reject ions having a radius which is too big to pass through the pores whose size has been influenced by the structure modifier. The structure modified by the structure modifier is that of the membrane formed when the curable composition is cured. The structure modifier is thought to cluster two (or more) ionic groups of component (ii) which are subsequently fixed in position by curing. In this way a more structured distribution of ionic groups in the membrane is obtained compared to the random distribution of ionic groups in membranes obtained from compositions which lack component (v).

Preferably component (v) has a solubility in water of pH 1 at 25° C. of at least 20 g per kg of water, more preferably at least 100 g per kg of water.

The structure modifier is preferably selected from the group consisting of polyvalent metal salts and organic compounds comprising at least two groups selected from amino and quaternary ammonium groups. Polyvalent metal salts are useful for 'locking' adjacent molecules of component (ii) close together, whereas organic compounds comprising at least two groups selected from amino and quaternary ammonium groups are useful for 'locking' adjacent molecules of component (ii) further apart.

Preferred polyvalent metal salts are divalent metal salts and trivalent and higher valent metal salts.

As examples of divalent metal salts which may be used as structure modifier there can be mentioned divalent magnesium, beryllium, calcium, chromium, strontium, barium, vanadium, cobalt, nickel, lead, copper, silver, manganese, iron, tin, cadmium and zinc salts and mixtures comprising two or more of such salts. Especially preferred are magnesium, calcium and strontium salts. The salts preferably comprise one or more anions selected from fluoride, chloride, bromide, iodide, hydride, hydroxide, nitrate, carbonate, bicarbonate, phosphate, hydrogen phosphate, i.e. mono- and dihydrogen phosphate, sulfate, thiosulphate, formate, acetate, citrate, oxalate, cyanate and/or thiocyanate.

Especially preferred anionic group(s) present in component (ii) have a pKa of between 4 and 13, more preferably between 5 and 12. This preference arises because at higher pH gelling may sometimes occur and this is not desirable when trying to form a membrane. Especially preferred anionic group(s) present in component (ii) are hydroxide, acetate, citrate, oxalate, carbonate, bicarbonate, phosphate, monohydrogen phosphate and dihydrogen phosphate groups and combinations of two or more thereof. With these anionic groups pH control is usually easy making the recipe more robust. Combinations of anionic group(s) which may be present in component (ii) preferably comprise at least one anionic group having a pKa of between 5 and 12, e.g. one may use a combination of a calcium hydrogen phosphate group and a calcium hydroxide group. Typically the anionic group(s) present in component (ii) comprise a counterion (cation). In one embodiment the counterion (cation) comprises a polyvalent metal and monovalent metal, e.g. a mixture of a calcium and lithium counterions. For example one may include in the composition a mixture of calcium hydrogen phosphate as component (v) and lithium hydroxide (which is not component (v)), wherein preferably the molar ratio of multivalent (e.g. calcium) and monovalent (e.g. lithium) salts is larger than 1. The wt % of salt referred to in this specification refers to the salt as a whole, i.e. both the cation and anion.

As examples of trivalent and higher valent metal salts there may be mentioned iron (III) salts, chromium (III) and (VI) salts, aluminium (II) and (III) salts, gallium salts, titanium (III) and (IV) salts, zirconium (III) and (IV) salts, vanadium (III), (IV) and (V) salts, tin (IV) salts, scandium salts, indium salts, yttrium salts.

In a preferred composition according to the first aspect of the present invention the structure modifier is selected from the group consisting of salts comprising calcium, magnesium or strontium cations and hydroxide, acetate, citrate, oxalate, carbonate, bicarbonate, phosphate, monohydrogen phosphate or dihydrogen phosphate anions, and/or organic amines selected from the group consisting of ethylene diamine and triethylene diamine.

Examples of organic compounds comprising at least two groups selected from amino and quaternary ammonium groups which may be used as structure modifier include ethylene diamine, 1,3-diaminopropane, 1,4-diaminobutane, 1,6-diaminehexane, 1,4-diazabicyclo[2.2.2]octane (triethylene diamine, DABCO), piperazine, benzene-1,2-diamine, benzene-1,3-diamine, cyclohexane-1,2-diamine, cyclohexane-1,3-diamine, propane-1,1,1-triamine and mixtures comprising two or more of compounds. Especially preferred are ethylene diamine and triethylene diamine.

In one embodiment the ionic radius of the structure modifier is larger than the ionic radius of the ion that the resultant membrane will be used to remove, i.e. the ion which will permeate through the membrane, e.g. for the removal of magnesium ions. Preferably the ionic radius of the structure modifier is at least 10 pm larger than the ion to be removed. In this way the structure of the membrane may be tuned to the desired use by choosing an appropriate structure modifier. The ionic radius of the structure modifier for removing magnesium ions is preferably at least 80 pm, more preferably at least 95 pm.

In another embodiment the ionic radius of the structure modifier is identical to the ionic radius of the ion that the resultant membrane will be used to remove, e.g. for removal of calcium ions the use of a calcium salt as structure modifier surprisingly gives good results. When making membranes intended for removing magnesium or calcium ions it is preferred that component (v) comprises one or more calcium salts.

Component (v) optionally comprises one or more than one structure modifier. Component (v) optionally comprises one or more polyvalent metal salts and one or more organic compounds comprising at least two groups selected from amino and quaternary ammonium groups.

The curable composition optionally contains (vi) 0 to 20 wt %, preferably 0 to 10 wt %, of curable compound(s) having one ethylenically unsaturated group and no anionic groups.

The curable composition may contain other components, for example acids, pH controllers, preservatives, viscosity modifiers, stabilisers, dispersing agents, antifoam agents, organic/inorganic salts, anionic, cationic, non-ionic and/or amphoteric surfactants, buffers and the like.

The curable composition may of course contain further components not specifically mentioned or excluded above.

Preferably the composition is radiation-curable, e.g. UV (ultraviolet)-curable.

Curing rates may be increased by including an amine synergist in the curable composition. Suitable amine synergists are, for example, free alkyl amines, e.g. triethylamine or triethanol amine; aromatic amines, e.g. 2-ethylhexyl-4-dimethylaminobenzoate, ethyl-4-dimethylaminobenzoate and also polymeric amines as polyallylamine and its derivatives.

Curable amine synergists such as ethylenically unsaturated amines (e.g. acrylated amines) are preferable since their use will give less odour due to their ability to be incorporated into the membrane by curing and also because they may contain a basic group which can be useful in the final (anion permeable) membrane.

The amount of amine synergists, when used, is preferably from 0.1 to 10 wt %, more preferably from 0.3 to 3 wt %.

In view of the foregoing a particularly preferred curable composition of the invention comprises the components:

(i) 2 to 40 wt % non-ionic crosslinker(s);
(ii) (a) 20 to 60 wt % curable ionic compound(s) comprising an anionic group and one (i.e. only one) ethylenically unsaturated group; and
(b) 0 to 60 wt % curable ionic compound(s) comprising an anionic group and at least two ethylenically unsaturated groups;
(iii) 15 to 45 wt % solvent(s);
(iv) 0 to 5 wt % of photoinitiator(s); and
(v) 4 to 35 wt % of structure modifier(s) capable of forming ionic bonds with component (ii) (especially polyvalent metal salt(s) and/or organic compound(s) comprising at least two groups selected from amino and quaternary ammonium groups);
wherein the molar ratio of component (v):(ii) is 0.25 to 0.65.

Where desired, a surfactant or combination of surfactants may be included in the composition as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants include fluorosurfactants, silicon-based surfactants and mixtures thereof. Silicon-bases surfactants include polysiloxanes, especially those soluble in water and/or alcohol. Suitable surfactants include Tego® Glide 100, 110, 130, 410, 432, 435, 440, 450, ZG-400 and Tego® Twin 4100 from Evonik, Dynol® 810 and 960 from Air Products and Chemicals, Capstone® surfactants from DuPont, e.g. FS-10, FS-30, FS-31, FS-32, FS-34, FS-35, FS-3100, FS-50, FS-51, FS-61, FS-63, FS-64 and FS-65, and FC-5120 from 3M.

Preferably the components of the curable composition are selected such that no phase separation occurs during preparation and/or storage of the composition or during the curing step. In this way, the likelihood of a porous structure in the resultant membrane is reduced.

Preferably the ethylenically unsaturated group is a (meth) acrylamide group.

Preferably the curable composition is free from, or substantially free from, methacrylic compounds (e.g. methacrylate and methacrylamide compounds), i.e. the composition comprises at most 10 wt %, more preferably at most 4 wt %, of compounds which are free from acrylic groups and comprise one or more methacrylic groups.

Preferably the curable composition is free from, or substantially free from, divinyl benzene.

Preferably the curable composition is free from, or substantially free from, styrene.

Preferably the curable composition is free from, or substantially free from, dyes and pigments. This is because there is no need to include dyes or pigments in the composition.

Thus the preferred curable composition is free from, or substantially free from, divinyl benzene, dyes, pigments, styrene, methacrylic compounds and compounds having tetralkyl-substituted quaternary ammonium groups.

According to a second aspect of the present invention there is provided a process for preparing a membrane comprising the following steps:
(i) applying a curable composition to a support; and
(ii) curing the composition to form a membrane;
wherein the curable composition is as defined in the first aspect of the present invention.

Optionally the process further comprises the step of removing at least some of the structure modifier from the membrane. When the structure modifier is or comprises a polyvalent metal salt some or all of the structure modifier may be removed from the membrane by, for example, ion exchange and/or washing.

Hitherto such membranes have often been made in slow and energy intensive processes, often having many stages. The present invention enables the manufacture of membranes in a simple process that may be run continuously for long periods of time to mass produce membranes relatively cheaply.

Optionally the process comprises the further step of separating the cured composition and support. However if desired this further step may be omitted and thereby a composite membrane is produced comprising the cured composition and a porous support.

The membrane is preferably a cation exchange membrane.

The thickness of the membrane, including the support, when present, is preferably less than 250 μm, more preferably between 10 and 200 μm, most preferably between 20 and 150 μm.

Preferably the membrane has an ion exchange capacity of at least 0.1 meq/g, more preferably of at least 0.3 meq/g, especially more than 0.6 meq/g, more especially more than 1.0 meq/g, based on the total dry weight of the membrane and any porous support and any porous strengthening material which remains in contact with the resultant membrane. Ion exchange capacity may be measured by titration as described by Dlugolecki et al, J. of Membrane Science, 319 (2008) on page 217.

Preferably the membrane has a permselectivity for small cations (e.g. Na+) of more than 80%, more preferably more than 85% and especially more than 90%. It was found that for RED a permselectivity of more than 80% is sufficient to obtain satisfactory results. For other applications, e.g. ED, a higher permselectivity is preferred.

Surprisingly the presence of component (v) provides membranes having low electrical resistance for not only multivalent ions but also for monovalent ions.

Preferably the membrane has an electrical resistance less than 15 ohm·cm$^2$, more preferably less than 5 ohm·cm$^2$, most preferably less than 3 ohm·cm$^2$, when measured at an ion concentration of 0.5 M sodium chloride solution.

Preferably the membrane obtained from the process according to the second aspect of the present invention has an electrical resistance less than 10 ohm·cm$^2$, more preferably less than 7 ohm·cm$^2$, more preferably less than 5 ohm·cm$^2$ for 0.5 M MgCl$_2$. Preferably the ratio of the electrical resistance of the membrane obtained from the process according to the second aspect of the present invention for magnesium ions to that of sodium ions is less than 3, more preferably less than 2.5, measured at a concentration of 0.5 M. Thus the membrane obtained from the process according to the second aspect of the present invention preferably has a low electrical resistance for multivalent ions, preferably lower than 7 ohm·cm$^2$, especially lower than 5 ohm·cm$^2$, as measured using 0.5 M magnesium chloride, a low electrical resistance for monovalent ions, preferably lower than 5 ohm·cm$^2$, especially less than 3 ohm·cm$^2$, as measured using 0.5 M sodium chloride, and a ratio of the electrical resistance of the membrane for magnesium ions to that of sodium ions of less than 3, more preferably less than 2.5. The electrical resistance may be determined by the method described below in the examples section.

Preferably the membrane exhibits a swelling in water of less than 100%, more preferably less than 75%, most preferably less than 60%. The degree of swelling can be controlled by the amount of crosslinker, the amount of non-curable compounds and by selecting appropriate parameters in the curing step and further by the properties of the porous support.

Permselectivity and % swelling in water may be measured by the methods described by Dlugolecki et al, J. of Membrane Science, 319 (2008) on pages 217-218.

Typically the ion exchange membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 2 nm.

The resultant membrane preferably has a low water permeability so that ions may pass through the membrane and water molecules do not pass through the membrane. Preferably the membrane has a water permeability lower than $1·10^{-7}$ m$^3$/m$^2$·s·kPa, more preferably lower than $1·10^{-8}$ m$^3$/m$^2$·s·kPa, most preferably lower than $5.10^{-8}$ m$^3$/m$^2$·s·kPa, especially lower than $1·10^{-8}$ m$^3$/m$^2$·s·kPa. The preferred water-permeability depends on the intended use of the membrane.

The network structure of the membrane is determined to a large extent by the identity and amount of the crosslinker(s), the structure modifier(s) and the curable compound(s) and their functionality, e.g. the number of crosslinkable groups they contain per molecule.

During the curing process, the curable composition may form a layer on top of the support, or it may permeate wholly or partially into the pores of the support thereby forming an impregnated composite membrane. The curable composition may also be applied to both sides of the support to achieve a symmetrical composite membrane. In a preferred embodiment the support is saturated with the composition and the saturated support is cured by EB or UV irradiation.

The process of the present invention may contain further steps if desired, for example washing and/or drying the resultant membrane.

Before applying the curable composition to the surface of the support, the support may be subjected to a corona discharge treatment, plasma glow discharge treatment, flame treatment, ultraviolet light irradiation treatment, chemical treatment or the like, e.g. for the purpose of improving its wettability and adhesiveness.

The support may also be treated to modify its surface energy, e.g. to values above 70 mN/m.

While it is possible to prepare the membrane on a batch basis using a stationary support, to gain full advantage of the invention it is much preferred to prepare the membrane on a continuous basis using a moving support. The support may be in the form of a roll which is unwound continuously or the support may rest on a continuously driven belt (or a combination of these methods). Using such techniques the curable composition can be applied to the support on a continuous basis or it can be applied on a large batch basis.

The curable composition may be applied to the support by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating. The coating of multiple layers can be done simultaneously or consecutively. When coating multiple layers the curable compositions may be the same of different. For simultaneous coating of multiple layers, curtain coating, slide coating and slot die coating are preferred. The curable composition(s) may be applied to one side of the support or to both sides of the support.

In one embodiment at least two of the curable compositions, which may be the same of different, are applied to the support, e.g. simultaneously or consecutively. The curable compositions may be applied to the same side of the support or to different sides. Thus the application step may be performed more than once, either with or without curing being performed between each application. When applied to different sides the resultant composite membrane may be symmetrical or asymmetrical and the layers of curable composition may have the same or different thicknesses. When applied to the same side a composite membrane may be formed comprising at least one top layer and at least one bottom layer that is closer to the support than the top layer. In this embodiment the top layer and bottom layer, together with any intervening layers, constitute the membrane and the porous support provides strength to the resultant composite membrane.

Thus in a preferred process, the curable composition is applied continuously to a moving support, more preferably by means of a manufacturing unit comprising one or more curable composition application station(s), one or more irradiation source(s) for curing the composition, a membrane collecting station and a means for moving the support from the curable composition application station(s) to the irradiation source(s) and to the membrane collecting station.

The curable composition application station(s) may be located at an upstream position relative to the irradiation source(s) and the irradiation source(s) is/are located at an upstream position relative to the membrane collecting station.

In order to produce a sufficiently flowable curable composition for application by a high speed coating machine, it is preferred that the curable composition has a viscosity below 5000 mPa·s when measured at 35° C., more preferably from 1 to 1500 mPa·s when measured at 35° C. Most preferably the viscosity of the curable composition is from 2 to 500 mPa·s when measured at 35° C. For coating methods such as slide bead coating the preferred viscosity is from 2 to 150 mPa·s when measured at 35° C. One may measure viscosity using a viscosity meter from Brookfield, model LVDV-II+, fitted with spindle SCA-18 rotated at 30 rpm.

With suitable coating techniques, the curable composition may be applied to a support moving at a speed of over 5 m/min, preferably over 10 m/min, more preferably over 15 m/min, e.g. more than 20 m/min, or even higher speeds, such as 30 m/min, or up to 100 m/min can be reached.

Curing is preferably performed by radical polymerisation, preferably using electromagnetic radiation. The source of radiation may be any source which provides the wavelength and intensity of radiation necessary to cure the composition. A typical example of a UV light source for curing is a D-bulb with an output of 600 Watts/inch (240 W/cm) as supplied by Fusion UV Systems. Alternatives are the V-bulb and the H-bulb from the same supplier.

When no photoinitiator is included in the curable composition, the composition can be cured by electron-beam exposure, e.g. using an exposure of 50 to 300 keV. Curing can also be achieved by plasma or corona exposure During curing the components (i) and (ii) polymerise to form a polymeric membrane. Preferably curing occurs sufficiently rapidly to form a membrane within 30 seconds. If desired further curing may be applied subsequently to finish off, although generally this is not necessary.

The curing is preferably achieved by irradiating the composition with ultraviolet light or an electron beam.

Preferably curing of the curable composition begins within 3 minutes, more preferably within 60 seconds, after the composition has been applied to the support.

Preferably the curing is achieved by irradiating the curable composition for less than 30 seconds, more preferably less than 10 seconds, especially less than 3 seconds, more especially less than 2 seconds. In a continuous process the irradiation occurs continuously and the speed at which the curable composition moves through the beam of irradiation is mainly what determines the time period of curing.

Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photoinitiator included in the curable composition.

Suitable sources of ultraviolet light are mercury arc lamps, carbon arc lamps, low pressure mercury lamps, medium pressure mercury lamps, high pressure mercury lamps, swirfflow plasma arc lamps, metal halide lamps, xenon lamps, tungsten lamps, halogen lamps, lasers and ultraviolet light emitting diodes.

Particularly preferred are ultraviolet light emitting lamps of the medium or high pressure mercury vapour type and ultraviolet light emitting diodes. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 80 and 2000 mJ/cm$^2$, especially between 100 and 900 mJ/cm$^2$, more especially between 150 and 500 mJ/cm$^2$. The exposure does may be measured by a MicroCure® Radiometer type MC-2 from EIT, Inc. Exposure times can be chosen freely but preferably are short and are typically less than 10 seconds, more preferably less than 5 seconds, especially less than 3 seconds, more especially less than 2 seconds, e.g. between 0.1 and 1 second.

To reach the desired exposure dose at high coating speeds, more than one UV lamp may be used, so that the curable composition is irradiated more than once. When two or more lamps are used, all lamps may give an equal dose or each lamp may have an individual setting. For instance the first lamp may give a higher dose than the second and following lamps or the exposure intensity of the first lamp may be lower. Varying the exposure dose of each lamp may influence the polymer matrix structure and the final crosslink density. In a preferred embodiment the composition is cured by simultaneous irradiation from opposite sides using two or more irradiation sources, e.g. two lamps (one at each side). The two or more irradiation sources preferably irradiate the composition with the same intensity as each other. By using this symmetric configuration, a higher crosslinking efficiency can be achieved and curling of the membrane can be reduced or prevented.

Curing by irradiation with UV or electron beam is preferably performed at between 20 and 60° C. While higher temperatures may be used, these are not preferred because they can lead to higher manufacturing costs.

Preferred supports are porous, e.g. they may be a woven or non-woven synthetic fabric, e.g. polyethylene, polypropylene, polyacrylonitrile, polyvinyl chloride, polyester, polyamide, and copolymers thereof, or porous membranes based on e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene, polychlorotrifluoroethylene, and copolymers thereof.

Various porous supports are available commercially, e.g. from Freudenberg Filtration Technologies (Novatexx materials) and Sefar AG.

Surprisingly, ion exchange membranes with anionic groups (e.g. sulpho, carboxyl and phosphato groups) can exhibit good properties in terms of their permselectivity and conductivity while at the same time being not overly expensive to manufacture by the present process.

The present process allows the preparation of membranes having a desirable degree of flexibility, without being overly flexible or too rigid. The presence of the solvent improves coatability for the curable composition and can provide thin membranes with low numbers of defects, low tendency to curl while retaining good durability in use.

According to a third aspect of the present invention there is provided a membrane obtained by a process comprising curing a curable composition according to the first aspect, e.g. by means of a process according to the second aspect of the present invention.

The membranes according to the third aspect of the present invention may also be put to other uses requiring membranes having anionic groups.

The membranes according to the third aspect of the present invention preferably have the properties described above in relation to the second aspect of the present invention.

The membranes of the invention are particularly useful for ED, (C)EDI, EDR, FTC, ZDD and RED, although they may also be used for other purposes. Due to the low electrical resistance of the membranes for multivalent cations the membranes are particularly suitable for removal of such multivalent ions, e.g. magnesium, calcium, iron, manganese, barium and radium ions, making the membranes very suitable for water softening. Application for water softening can be found in point-of-entry systems, e.g. to provide softened water to households, and in point-of-use systems, e.g. washing machines, coffee machines, dishwashers, etc.

According to a fourth aspect of the present invention there is provided use of a membrane according to the third aspect of the present invention for water treatment (e.g. purification) or for the generation of electricity.

According to a fifth aspect of the present invention there is provided an electrodialysis or reverse electrodialysis unit, an electrodeionization module or a capacitive deionization apparatus, e.g. a flow through capacitor, comprising one or more membranes according to the third aspect of the present invention. The electrodeionization module is preferably a continuous electrodeionization module.

FIG. 1 shows the effect of feed composition and membrane type on the gross power density in a reverse electrodialysis unit according to the present invention, as described in more detail in the Examples.

Preferably the electrodialysis or reverse electrodialysis unit or the electrodeionization module or the capacitive deionization apparatus comprises at least one anode, at least one cathode and one or more membrane according to the third aspect of the present invention. Preferably the one or more membranes of the unit comprise a membrane according to the third aspect of the present invention having anionic groups and a further membrane having cationic groups.

In a preferred embodiment the unit comprises at least 3, more preferably at least 5, e.g. about 36, about 128, about 600 or up to about 1500, membranes according to the third aspect of the present invention, the number of membranes being dependent on the application. The membrane may for instance be used in a plate-and-frame or stacked-disk configuration or in a spiral-wound design. Alternatively, a continuous first membrane according to the present invention having anionic groups may be folded in a concertina (or zigzag) manner and a second membrane having cationic groups (i.e. of opposite charge to the first membrane) may be inserted between the folds to form a plurality of channels along which fluid may pass and having alternate anionic and cationic membranes as side walls.

According to a sixth aspect of the present invention there is provided a process for reducing the concentration of an ion in an aqueous liquid comprising that ion comprising contacting the liquid with a membrane according to the third aspect of the present invention and allowing the ion to pass through the membrane, wherein the ion has an ionic radius which is at least 10 pm smaller than the ionic radius of the structure modifier present in said curable composition. When the structure modifier is an organic compound comprising at least two groups selected from amino and quaternary ammonium groups the ionic radius of the structure modifier is the distance between the at least two groups selected from amino and quaternary ammonium groups.

The invention will now be illustrated by the following non-limiting Examples.

Experimental Methods

Electrical resistance ("ER") (ohm·cm$^2$) was measured by the method described by Dlugolecki et al, J. of Membrane Science, 319 (2008) on page 217-218 with the following modifications:

the auxiliary membranes were CMX and AMX from Tokuyama Soda, Japan;

a Cole Parmer masterflex console drive (77521-47) with easy load II model 77200-62 gear pumps was used for all compartments;

the flowrate of each stream was 475 ml/min controlled by Porter Instrument flowmeters (type 150AV-B250-4RVS) and Cole Parmer flowmeters (type G-30217-90);

the effective area of the membrane was 3.14 cm$^2$.

as electrolyte was used 0.5 M NaCl, 0.5 M MgCl$_2$ or 0.5 M CaCl$_2$.

Permselectivity ("a (%)") was measured by using a static membrane potential measurement. Two cells were separated by the membrane under investigation. Prior to the measurement the membrane was equilibrated in a 0.05 M NaCl solution for at least 12 hours. Two streams having different NaCl concentrations were passed through cells on opposite sides of the membranes under investigation. One stream had a concentration of 0.05 M NaCl (from Sigma Aldrich, Minn. 99.5% purity) and the other stream was 0.5 M NaCl. The flow rate of both streams was 0.90 dm$^3$/min. Two Calomel reference electrodes (from Metrohm AG, Switzerland) were connected to Haber-Luggin capillary tubes that were inserted in each cell and were used to measure the potential difference over the membrane. The effective membrane area was 3.14 cm² and the temperature was 21° C.

When a steady state was reached, the membrane potential was measured ($\Delta V_{meas}$).

The permselectivity ($\alpha(\%)$) of the membrane was calculated according the formula:

$$\alpha(\%) = \Delta V_{meas}/\Delta V_{theor} * 100\%.$$

The theoretical membrane potential ($\Delta V_{theor}$) is the potential for a 100% Nernst equation.

EXAMPLES

The following ingredients were used to prepare the composite membranes:

Sr(OAc)₂ is strontium acetate from Sigma Aldrich.
Viledon® Novatexx 2223-10 is a nonwoven polyolefin porous support from Freudenberg Filtration Technologies.
PW is pure water (an inert solvent).
Surfactant is a polyether siloxane from Evonik.

Examples 1 to 9

The curable compositions of Examples Ex.1 to Ex.9 were prepared by mixing the indicated ingredients indicated in Table 1, wherein all amounts are the wt % of the relevant component.

TABLE 1

Curable Compositions

| Component | Identity | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| (iii) | PW | 23.1 | 20.9 | 21.4 | 22.6 | 17.4 | 25.4 | 20.4 | 23.1 | 21.5 |
| | IPA | 7.7 | 10.5 | 10.7 | 7.5 | 8.8 | 19.7 | 10.2 | 11.5 | 7.2 |
| | MeOH | 3.8 | 5.2 | 0 | 3.8 | 0 | 0 | 5.1 | 5.8 | 3.6 |
| other | Genorad | 0.4 | 0.4 | 0.4 | 0.4 | 0.5 | 0.7 | 0.4 | 0.4 | 0.4 |
| (ii) | AMPS | 38.1 | 34.9 | 35.6 | 37.1 | 43.1 | 33.9 | 34.0 | 38.5 | 35.9 |
| other | LiOH•H₂O | 1.9 | 0 | 0 | 0.9 | 1.1 | 0 | 0 | 0 | 1.8 |
| (v) | CaHPO₄•2H₂O | 9.5 | 14.0 | 14.3 | 12.6 | 0 | 0 | 0 | 0 | 10.8 |
| | Ca(OH)₂ | 0 | 0 | 0 | 0 | 0 | 5.9 | 0 | 0 | 0 |
| | Mg(OH)₂ | 0 | 0 | 0 | 0 | 0 | 0 | 0 | 5.2 | 0 |
| | Sr(OAc)₂ | 0 | 0 | 0 | 0 | 0 | 0 | 16.2 | 0 | 0 |
| | DABCO | 0 | 0 | 0 | 0 | 11.6 | 0 | 0 | 0 | 0 |
| (i) | MBA | 14.2 | 12.9 | 7.8 | 13.8 | 16.0 | 12.4 | 12.5 | 14.2 | 6.8 |
| (ii) | BAMPS | 0 | 0 | 8.6 | 0 | 0 | 0 | 0 | 0 | 10.8 |
| (iv) | Darocur™ 1173 | 0.4 | 0.4 | 0.4 | 0.4 | 0.5 | 0.7 | 0.4 | 0.4 | 0.4 |
| other | Surfactant | 0.9 | 0.8 | 0.8 | 0.9 | 1.0 | 1.3 | 0.8 | 0.9 | 0.8 |
| | Total (wt %) | 100 | 100 | 100 | 100 | 100 | 100 | 100 | 100 | 100 |
| | pH | 0.6 | 0.8 | 0.7 | | | | 2.6 | 0.6 | 0.8 |
| | Molar ratio of component (v):(ii) | 0.300 | 0.483 | 0.403 | 0.409 | 0.497 | 0.487 | 0.480 | 0.480 | 0.290 |

Note:
The wt % figures in Table 1 are calculated relative to the total weight of the composition.

MBA is N,N'-methylene bisacrylamide from Sigma Aldrich.
AMPS is 2-Acryloylamido-2-methylpropanesulfonic acid from Hang-Zhou (China).
BAMPS is the ammonium salt of 1,1-bis(acryloylamido)-2-methylpropane-2-sulphonic acid, synthesized as described in U.S. Pat. No. 4,034,001.
DABCO is 1,4-diazabicyclo[2.2.2]octane (triethylenediamine) from Sigma Aldrich.
Darocur™ 1173 is 2-hydroxy-2-methyl-1-phenyl-propan-1-one, a photoinitiator from BASF Resins, Paint & Coatings.
Genorad is a polymerisation inhibitor from Rahn.
IPA is 2-propanol from Shell (an inert organic solvent).
MeOH is methanol
LiOH.H₂O is lithium hydroxide monohydrate from Chemetall.
Ca(OH)₂ is calcium hydroxide from Sigma Aldrich.
Mg(OH)₂ is magnesium hydroxide from Sigma Aldrich.
CaHPO₄. 2H₂O is calcium hydrogenphosphate dihydrate from Sigma Aldrich.

Preparation of Membranes M1 to M9

Each of the curable compositions described in Table 1 was applied by hand to an aluminum underground carrier using a 100 μm wire wound bar, at a speed of approximately 5 m/min, followed by application to a Viledon® Novatexx 2223-10 non-woven support. Excess composition was scraped-off using a wire bar (Standard K bar No. 0 with 0.05 mm diameter wire, by RK Print Coat Instruments Ltd) and the impregnated support was cured by irradiation with UV light with a dose of 0.21 J/cm² at one side using a Light Hammer LH6 from Fusion UV Systems fitted with a D-bulb working at 100% intensity with a speed of 30 m/min (single pass). The curable compositions of Ex.1 to Ex.9 resulted in membranes M1 to M9 respectively.

Test Results on Membranes M1 and M2 and Comparative Membrane CM1

(A) Permselectivity and Electrical Resistance Results

As comparative membrane CM1 there was used a Type 1 cation exchange membrane from Fujifilm obtained from a curable composition lacking component (v).

Results

TABLE 2

Electrical resistance and permselectivity data

| Test (ER or α (%)) | Membrane | | | | | | | | | |
|---|---|---|---|---|---|---|---|---|---|---|
| | M1 | M2 | M3 | M4 | M5 | M6 | M7 | M8 | M9 | CM1 |
| ER using 0.5M NaCl | 2.0 | 2.0 | 1.4 | 2.3 | 3.8 | 4.0 | 1.7 | 1.7 | 1.6 | 2.6 |
| ER using 0.5M $MgCl_2$ | 4.9 | 3.8 | 2.8 | 4.8 | 5.4 | 6.9 | 3.2 | 3.5 | 2.6 | 9.0 |
| ER using 0.5M $CaCl_2$ | — | 3.4 | — | — | — | — | 2.4 | 2.8 | — | 8.0 |
| Ratio ER Mg/ER Na | 2.4 | 1.9 | 2.0 | 2.1 | 1.4 | 1.7 | 1.9 | 2.1 | 2.6 | 3.5 |
| α (%) | 95 | 89 | 85 | 90 | 84 | 84 | 87 | 89 | 89 | 89 |

In Table 2 "ER" means electrical resistance when tested with the indicated 0.5 M solution of NaCl, $MgCl_2$ or $CaCl_2$. "a (%)" means permselectivity, measured as described above.

The ratio of ER Mg/ER Na was much lower for Examples Ex.1 to Ex.9 than for Comparative Example CEx.1 made from a composition lacking component (v). This indicates the relative permeability of the membrane for multivalent ions compared to monovalent ions.

(B) Power Density Results

Preparation of Membrane Stacks

First the ion exchange membranes M1, M2 and CM1 were equilibrated over a minimum period of two hours in a 0.5 M NaCl solution prior to building membrane stacks containing them. The membrane stacks were then constructed by fitting 10 cell pairs into an 11×11 cm crossflow stack, purchased from RedStack B.V. Each cell pair comprised a cation exchange (one of membranes M1, M2 and CM1 described above) and an anion exchange membrane (Type 1 anion exchange membrane, obtained from Fujifilm) and the outermost membranes in all three of the stacks were membrane CM1. The resultant membrane stacks therefore comprised concentrate channels through which concentrated ionic solutions were passed and diluate channels through which dilute ionic solutions were passed.

The membrane stacks further comprised non-woven spacers (220 μm thick from Deukum GmbH) in both the concentrate and diluate channels to keep the membranes apart and allow the solutions to pass between the membranes. Ionic solutions were fed into the concentrate and diluate channels using Masterflex peristaltic pump from Cole-Parmer equipped with pulsation dampeners. As the power source for the stack there was used an Autolab PGSTAT302N with NOVA software from Metrohm.

The net membrane area of each membrane was 6.4×6.4 $cm^2$.

The electrolyte in the electrode compartments of the stack was 0.1 M $K_3Fe(III)(CN)_6$ and 0.1 M $K_4Fe(II)(CN)_6$ in 0.25 M NaCl.

Measurement Procedure

The stacks prepared above were used in a reverse electrodialysis setup to generate electrical energy. The generated net power density (in $W/m^2$) of the abovementioned stacks comprising membranes M1, M2 or CM1 were measured as follows:

Four concentrate solutions (CSA to CSD) and four diluate solutions (DSA to DSD) indicated in Table 3 were passed through the concentrate and diluate channels respectively of each of the three stacks, each solution flowing at a rate of 53 ml/min (velocity 0.95 cm/s), temperature of 21° C. and using an average pumping energy of 0.27 $W/m^2$. In Table 3 below the amounts indicate the concentration of the relevant ions in millimoles per liter ([mM]).

TABLE 3

Concentrate and Diluate solutions used to test the Membranes M1, M2 and CM1

| Cation | Concentrate Channel [mM] | | | | Diluate Channel [mM] | | | |
|---|---|---|---|---|---|---|---|---|
| | CSA | CSB | CSC | CSD | DSA | DSB | DSC | DSD |
| $Na^+$ | 0.5 | 0.45 | 0.45 | 0.402 | 0.0171 | 0.0154 | 0.0154 | 0.0035 |
| $Mg^{2+}$ | 0 | 0.05 | 0 | 0.042 | 0 | 0.0017 | 0 | 0.0005 |
| $Ca^{2+}$ | 0 | 0 | 0.05 | 0.039 | 0 | 0 | 0.0017 | 0.0015 |
| $K^+$ | 0 | 0 | 0 | 0 | 0 | 0 | 0 | 0.0007 |
| Conductivity [mS/cm] | 47.9 | 49.7 | 50.5 | 50.2 | 1.9 | 2.2 | 2.2 | 1.0 |

The conductivity figures in Table 3 indicate the conductivity of the relevant solutions as they entered the stacks. Solutions CSA and DSA contained only water and NaCl. For Solutions CSB/DSB and CSC/DSC 10 mol % of the NaCl was replaced with either $MgCl_2$ or $CaCl_2$ respectively. Solutions CSD and DSD were designed to resemble the composition of seawater and river water respectively.

To determine the net power density of a stack, the stack was fed with NaCl solutions CSA (through the concentrate channels) and DSA (through the diluate channels) and a current of 10 $A/m^2$ was applied during a period of 20 minutes to finalize equilibration. For each stack the DC resistance, the average current and the open circuit potential were measured for 11 current steps from 0 to 20 $A/m^2$ and back to 0 $A/m^2$. If the two corresponding data points differed too much the equilibration was repeated. If the measurements were reasonably consistent then the feed solutions CSA and DSB were replaced by the test solutions CSB and DSB, first CSB in the concentrate channel and then DSB in the diluate channel. After the measurement of the DC resistance, the average current and the open circuit potential for solutions CSB and DSB the feed solutions were changed back to solutions CSA and DSA. Subsequently the DC resistance, the average current and the open circuit potential for solutions CSC and DSC were measured in the same way. Analogously the feed solutions were changed back to solutions CSA and DSA and then the DC resistance, the average current and the open circuit potential for solutions CSD and DSD were measured in the same way. The stack resistance was corrected for the electrode compartments (blank).

From a plot of gross power density against current density the maximum power density was determined for each stack and this value was used to calculate the net power density. To calculate the net power density the pumping energy was subtracted from the measured gross power density. The results are given in Table 4.

TABLE 4

Net power density measurement (W/m²) for stacks comprising membranes M1, M2 or CM1

| Membrane Stack | Concentrate and Diluate Solutions Used | | | |
| --- | --- | --- | --- | --- |
| | Net Power Density when CSA/DSA are used | Net Power Density when CSB/DSB are used | Net Power Density when CSC/DSB are used | Net Power Density when CSD/DSD are used |
| Stack containing membrane M1 | 0.60 | 0.42 | 0.37 | 0.28 |
| Stack containing membrane M2 | 0.70 | 0.45 | 0.39 | 0.34 |
| Stack containing membrane CM1 | 0.58 | 0.23 | 0.28 | 0.18 |

The results in Table 4 indicate that with membranes M1 and M2 of the invention a much higher net power density was obtained than for Comparative Membrane CM1, especially for feed flows containing magnesium and/or calcium ions.

FIG. 1 shows the effect of feed composition and membrane type on the gross power density in a reverse electrodialysis unit according to the present invention.

In FIG. 1 it can be seen that an RED unit comprising membrane M2 fed with solutions CSA and DSA (solid round dots) had higher current density values than when the same solutions were passed through an RED unit which was identical except that the membranes M2 according to the invention were replaced with comparative membrane CM1 (hollow round dots).

FIG. 1 also shows that an RED unit comprising membrane M2 fed with solutions CSD and DSD to mimic sea water and stream water (solid triangles) had higher current density values than when the same solutions were passed through an RED unit which was identical except that the membranes M2 according to the invention were replaced with comparative membrane CM1 (hollow triangles).

The invention claimed is:

1. A process for preparing a membrane comprising the following steps:
  (i) applying a curable composition to a support; and
  (ii) curing the composition to form a membrane;
  wherein the curable composition comprises the components:
  (i) 0 to 60 wt % non-ionic crosslinker(s);
  (ii) 20 to 85 wt % curable ionic compound(s) comprising an anionic group and at least one ethylenically unsaturated group;
  (iii) 15 to 45 wt % solvent(s);
  (iv) 0 to 10 wt % of photoinitiator(s); and
  (v) 2 to 45 wt % of structure modifier(s) selected from the group consisting of polyvalent metal salts and organic compounds comprising at least two groups selected from amino and quaternary ammonium groups;
  wherein the molar ratio of component (v):(ii) is 0.25 to 0.65.

2. The process according to claim 1 wherein the curing step (ii) is performed such that the curable composition forms a layer on top of the support, or the curable composition permeates wholly or partially into the pores of the support thereby forming an impregnated composite membrane.

3. The process according to claim 1 wherein the composition comprises the components:
  (i) 2 to 40 wt % non-ionic crosslinker(s);
  (ii) (a) 20 to 60 wt % curable ionic compound(s) comprising an anionic group and one ethylenically unsaturated group; and
  (b) 0 to 60 wt % curable ionic compound(s) comprising an anionic group and at least two ethylenically unsaturated groups;
  (iii) 15 to 45 wt % solvent(s);
  (iv) 0 to 5 wt % of photoinitiator(s); and
  (v) 4 to 35 wt % of structure modifier(s) capable of forming ionic bonds with at least two of said anionic group(s);
  wherein the molar ratio of component (v):(ii) is 0.25 to 0.65.

4. The process according to claim 1 wherein the molar ratio of components (v):(ii) is 0.25 to 0.499.

5. The process according to claim 1 wherein the curing is performed using electron beam or UV radiation.

6. The process according to claim 1 wherein the composition is cured by irradiation with an electron beam or UV light for a period of less than 30 seconds.

7. The process according to claim 1 which further comprises the step of removing at least some of the structure modifier from the membrane.

8. The process according to claim 1 wherein component (v) has a solubility in water of pH 1 at 25° C. of at least 20 g per kg of water.

9. The process according to claim 1 wherein the structure modifier is or comprises a polyvalent metal salt and some or all of the structure modifier is removed from the membrane by ion exchange and/or washing.

10. The process according to claim 1 wherein the structure modifier is selected from the group consisting of salts comprising calcium, magnesium or strontium cations and hydroxide, acetate, citrate, oxalate, carbonate, bicarbonate, phosphate, monohydrogen phosphate or dihydrogen phosphate anions, and/or organic amines selected from the group consisting of ethylene diamine and triethylene diamine.

11. The process according to claim 1 wherein the curable composition is applied continuously to a moving support by means of a manufacturing unit comprising a curable composition application station, an irradiation source for curing the composition, a membrane collecting station and a means for moving the support from the curable composition application station to the irradiation source and to the membrane collecting station.

12. The process according to claim 1 wherein the ethylenically unsaturated group(s) is or are acrylic groups.

13. The process according to claim 1 wherein the molar ratio of components (v):(ii) is 0.25 to 0.499 and wherein the composition is cured by irradiation with an electron beam or UV light.

14. The process according to claim 1 wherein the molar ratio of components (v):(ii) is 0.25 to 0.499, the composition is cured by irradiation with an electron beam or UV light and the curing step (ii) is performed such that the curable composition forms a layer on top of the support, or the curable composition permeates wholly or partially into the pores of the support thereby forming an impregnated composite membrane.

15. The process according to claim 1 wherein the molar ratio of components (v):(ii) is 0.25 to 0.499, the composition is cured by irradiation with an electron beam or UV light and the structure modifier is selected from the group consisting of salts comprising calcium, magnesium or strontium cations and hydroxide, acetate, citrate, oxalate, carbonate, bicarbonate, phosphate, monohydrogen phosphate or dihydrogen phosphate anions, and/or organic amines selected from the group consisting of ethylene diamine and triethylene diamine.

16. The process according to claim 1 wherein the molar ratio of components (v):(ii) is 0.25 to 0.499, the composition is cured by irradiation with an electron beam or UV light, the curing step (ii) is performed such that the curable composition forms a layer on top of the support, or the curable composition permeates wholly or partially into the pores of the support thereby forming an impregnated composite membrane and the structure modifier is selected from the group consisting of salts comprising calcium, magnesium or strontium cations and hydroxide, acetate, citrate, oxalate, carbonate, bicarbonate, phosphate, monohydrogen phosphate or dihydrogen phosphate anions, and/or organic amines selected from the group consisting of ethylene diamine and triethylene diamine.

17. The process according to claim 15 wherein component (v) has a solubility in water of pH 1 at 25° C. of at least 20 g per kg of water.

18. The process according to claim 16 wherein component (v) has a solubility in water of pH 1 at 25° C. of at least 20 g per kg of water.

19. The process according to claim 1 wherein the support is a porous support.

20. A membrane obtained by performing the process of claim 1.

21. The membrane according to claim 20 which has a ratio of the electrical resistance of the membrane for magnesium ions to that of sodium ions of less than 3, when measured at an ion concentration of 0.5M.

22. The membrane according to claim 20 which has an electrical resistance for sodium ions of less than 3 ohm·cm$^2$ and for magnesium ions of less than 7 ohm·cm$^2$, when measured at an ion concentration of 0.5M.

* * * * *